US008464820B2

(12) United States Patent
Riesner

(10) Patent No.: US 8,464,820 B2
(45) Date of Patent: Jun. 18, 2013

(54) AIR CUSHION PLATFORM FOR CARRYING A MANIPULATOR ARM AND MOVABLE ROBOT

(75) Inventor: Stefan Riesner, München (DE)

(73) Assignee: Robotics Technology Leaders GmbH, Munich (DE)

( * ) Notice: Subject to any disclaimer, the term of this patent is extended or adjusted under 35 U.S.C. 154(b) by 185 days.

(21) Appl. No.: 13/055,404

(22) PCT Filed: Jul. 22, 2009

(86) PCT No.: PCT/EP2009/005326
§ 371 (c)(1),
(2), (4) Date: Mar. 29, 2011

(87) PCT Pub. No.: WO2010/009878
PCT Pub. Date: Jan. 28, 2010

(65) Prior Publication Data
US 2011/0174563 A1   Jul. 21, 2011

(30) Foreign Application Priority Data

Jul. 22, 2008   (DE) ..................... 20 2008 009 838 U

(51) Int. Cl.
*B60V 1/00*   (2006.01)
(52) U.S. Cl.
USPC .......................................... 180/125; 180/121
(58) Field of Classification Search
USPC ............... 180/117, 119, 121, 125, 19.1, 19.2, 180/19.3
See application file for complete search history.

(56) References Cited

U.S. PATENT DOCUMENTS

| 3,295,700 | A | | 1/1967 | Ziegler |
| 3,950,038 | A | * | 4/1976 | Wood ............................... 305/34 |
| 4,440,253 | A | * | 4/1984 | Pernum ......................... 180/116 |
| 4,567,957 | A | * | 2/1986 | Johnson ........................ 180/124 |
| 7,891,446 | B2 | * | 2/2011 | Couture et al. ............. 180/9.32 |
| 2009/0226292 | A1 | | 9/2009 | Habisreitinger |
| 2010/0200321 | A1 | * | 8/2010 | Park ............................. 180/117 |

FOREIGN PATENT DOCUMENTS

| DE | 9100213.3 U1 | 3/1991 |
| DE | 102006026132 A1 | 6/2007 |
| DE | 102007011028 A1 | 12/2007 |

* cited by examiner

*Primary Examiner* — Tony Winner
(74) *Attorney, Agent, or Firm* — Muncy, Geissler, Olds & Lowe, PLLC

(57) ABSTRACT

An air cushion platform for carrying a manipulator arm, having a base, on the bottom side of which an air cushion system is attached for lifting the base from a standing position into a moving position above a bottom. At least one actuator device is mounted on the base, which actuator device is optionally in constant contact with the bottom in order to move the base at the bottom. A controller is connected to the air cushion system and the at least one actuator device in order to actuate the actuator device only if the air cushion platform is located in a moving position. A moveable robot is provided, particularly for the controlled guiding of a tool. The moveable robot has an air cushion platform, a foundation mounted on the air cushion platform and moveably supported thereby, and a manipulator arm having one end section that is attached to the foundation and another end that carries a tool.

9 Claims, 9 Drawing Sheets

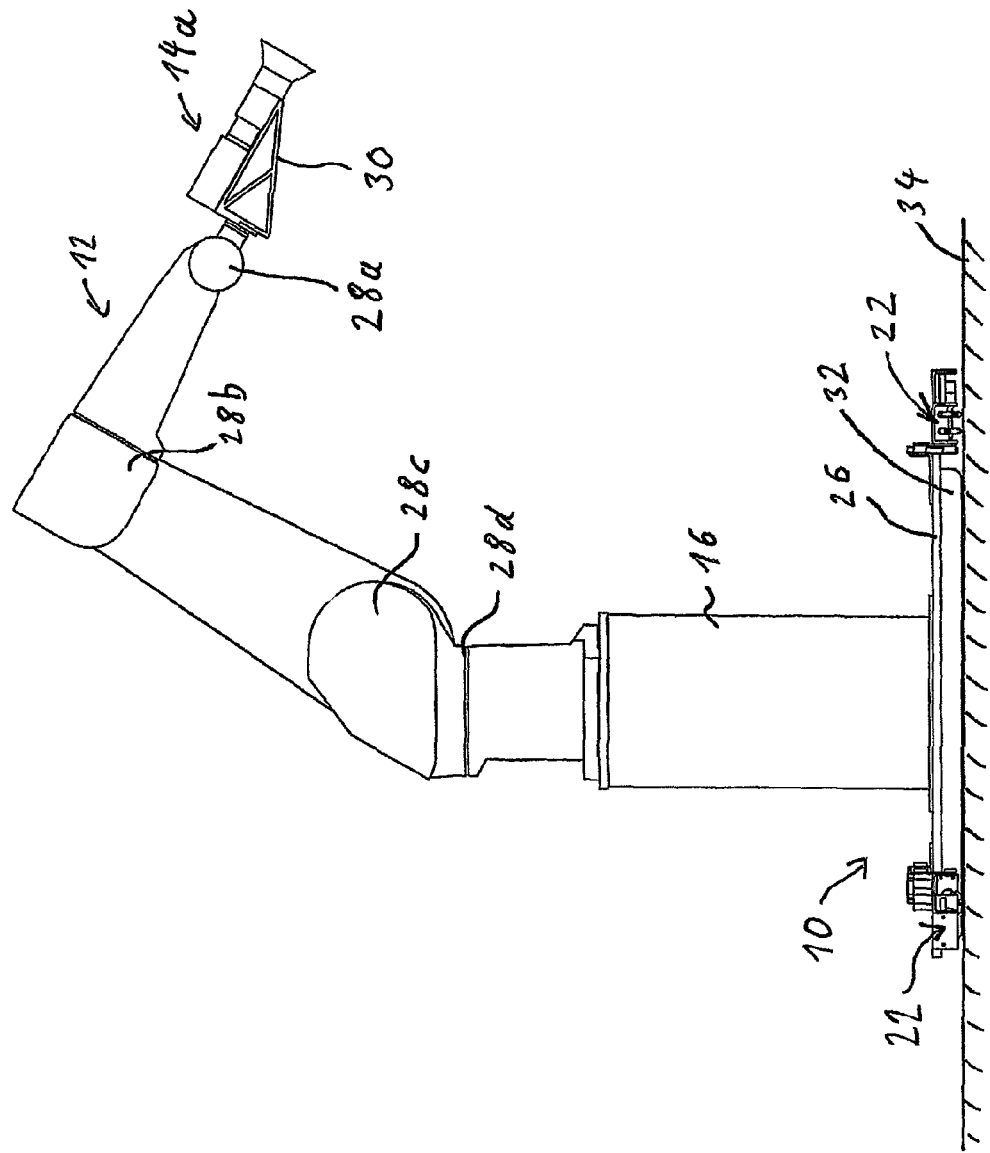

AIR CUSHION PLATFORM FOR CARRYING A MANIPULATOR ARM AND MOVABLE ROBOT

Figure 1A:
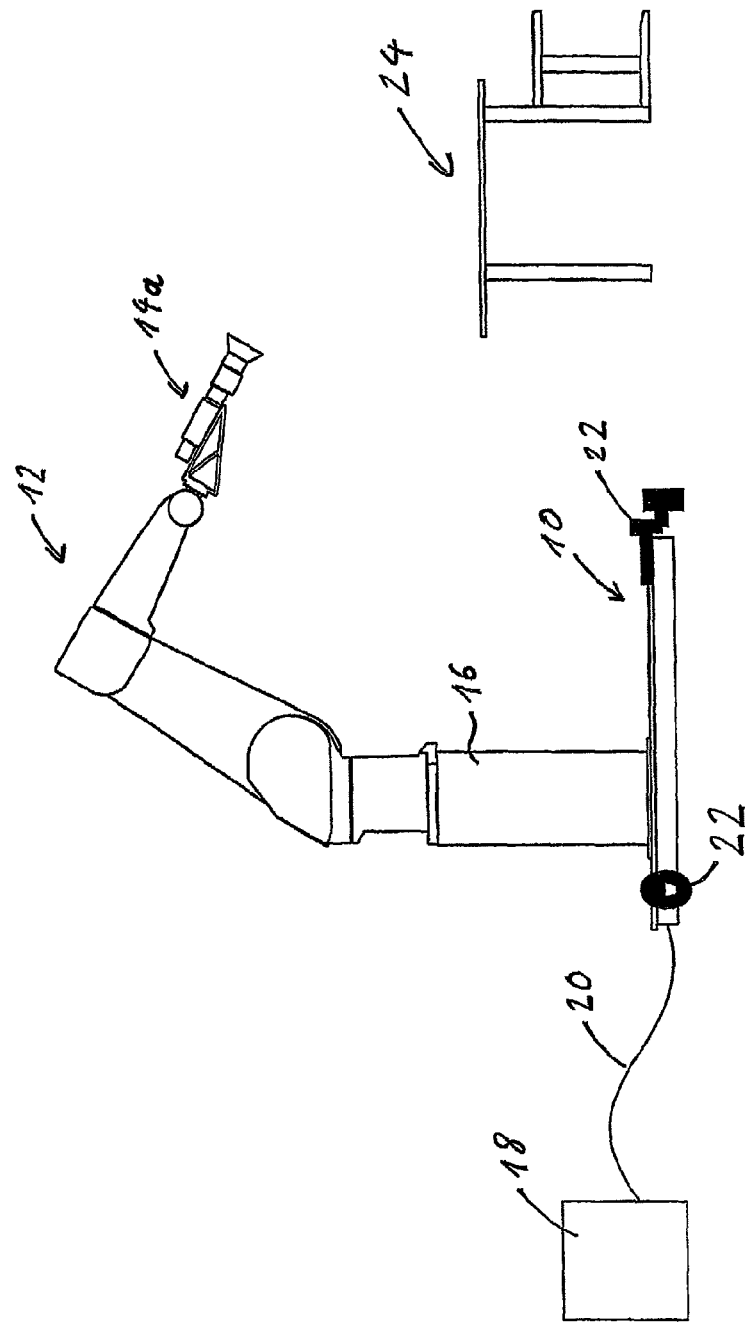

The invention relates to an air cushion platform for carrying a manipulator arm and to a movable robot which is provided for the controlled guiding of a tool, in particular a film camera.

In the production of films and television programs, virtual worlds are often used in which the protagonists, such as actors or newscasters, are recorded. This technology is known, inter alia, as blue screen or green screen technology. In order to be able, when filming using a camera, to match this virtual world later to the actual image appropriately with the correct perspective, it is necessary to know the precise position of the focal point of the camera and the direction in which it is pointing, in other words its orientation in space. To achieve this, robots are used which have servo shafts with shaft encoders, wherein at any time (for example, in 4 ms cycles) the location of the individual shafts can be interrogated and the position of the camera and its orientation thus determined.

With this technology, however, the reach of the manipulator arm is limited so that, for example, a tracking shot where the position and orientation can be determined at any time is not possible. Because of the high weight of the manipulator arm and the camera, the direct use of usually filigree actuator devices on which the manipulator arm and the camera are mounted is, moreover, not possible or only at considerable expense.

Air cushion platforms are, moreover, known in the prior art which can usually be displaced by hand. Furthermore, external motor drives for air cushion platforms exist which can be clicked into the air cushion platform in order to displace the latter by means of a cylindrical drive which is driven by a high-powered motor. A reproducible change in position is, however, not possible with these systems.

The object of the invention is to provide an air cushion platform for carrying a manipulator arm, and a movable robot, with which a precise and reproducible change in position is possible.

This object is achieved by the air cushion platform as claimed in claim 1 and the movable robot as claimed in claim 15. Advantageous embodiments and further developments of the invention are described in the subclaims.

According to the invention, an air cushion platform for carrying a manipulator arm is provided, having a base on the bottom side of which an air cushion system is attached for lifting the base from a standing position into a moving position above a floor, at least one actuator device fastened on the base, which actuator device is in constant contact or selectively in constant contact with the floor in order to move the base on the floor, and a controller which is connected to the air cushion system and the at least one actuator device, in order to actuate the actuator device only when the air cushion platform is located in a moving position.

An air cushion system for carrying a manipulator arm is thus provided which can move heavy loads along a floor surface smoothly by means of an air cushion system, further actuating devices being provided on the air cushion platform which are suited for displacing the air cushion platform to precise positions when the air cushion system is operational.

When the base of the air cushion platform is not designed in the manner of a plate but has at least three feet, as is the case for a television tripod, a pump or a pedestal, or for an inexpensive realization of the air cushion system, it is advantageous if the air cushion system comprises at least three air lifting cushions which are attached around the center of gravity of the air cushion platform.

To effect a balanced pressure setting within the air cushion system in the event of an uneven distribution of weight on the base of the air cushion platform, it is particularly expedient if the air cushion system comprises a pallet with a single air cushion or an air cushion system with a plurality of air cushions connected to one another.

For a simple realization of the air cushion platform according to the invention, the at least one actuator device comprises a motor device which is mounted on the base so that it can be displaced vertically by means of a sliding guide.

It is hereby advantageous if the sliding guide comprises a fastening bracket with a first and a second arm, the second arm being perpendicular to the first arm and the first arm being suited for fastening the sliding guide to the base, a rail element which is connected to the second arm of the fastening bracket, and a carriage which is mounted in sliding fashion on the rail element and which is connected to the motor device.

To effect a reproducible displacement of the air cushion platform to precise positions, it is hereby advantageous if the motor device comprises a direct-current geared motor which is designed as a servo motor and has an encoder, and comprises at least one driving wheel which is connected to a motor shaft of the direct-current geared motor and is in constant contact with the floor via an actuator device fastened to the base.

In order to prevent damage to the motor device owing to impacts from the side or above, it is advantageous if the motor device also has a wheel housing and a motor protecting bracket to protect the at least one driving wheel and the motor.

For slip-free contact of the driving wheels with the floor, it is hereby advantageous if the motor device is pressed against the floor by means of a spring which is operatively attached between the motor device and the base.

It is, however, also conceivable that the motor device has an extra weight, which is arranged above the at least one driving wheel, to keep the driving wheel in contact with the floor owing to the gravitational force of the extra weight.

In order to be able to reliably identify, classify, measure and detect the position of the environment, or reference points which are attached to the floor or objects, so that the independent position and orientation of the air cushion platform with respect to the reference points can be determined, or so that a collision can be avoided with objects situated in the space such as tables, appliances or people, it is particularly advantageous if the air cushion platform comprises sensors for position detection such as a laser scanner.

When the sensors for position detection themselves have a significant weight, it is advantageous if the sensors for position detection are used as an extra weight.

In the case of normal driving wheels, it is expedient for a change in the direction of travel of the air cushion platform if the motor device is mounted rotatably and pivotably on the sliding guide.

It is, however, also conceivable to mount the motor device non-rotatably and non-pivotably on the sliding guide. It is particularly expedient here if the at least one driving wheel corresponds to a pair of omni wheels, three actuator devices advantageously being arranged on the base in a circle and being provided at an angle of 120° to one another, the common point of intersection of the three motor shafts of the motor devices being the approximate center of gravity of the entire system.

Furthermore, according to the invention a movable robot, in particular for the controlled guiding of a tool, is provided which comprises an air cushion platform according to the invention, a pedestal which is mounted on the air cushion platform and is carried by the latter in such a way that it can move, and a manipulator arm which is fastened with one of its end portions to the pedestal and which carries a tool with its other end (or hand).

In one embodiment of the invention, the tool is here a film camera, but in a further embodiment of the invention the tool can also be a gripping hand.

In order to prevent damage to the driving wheels owing to a movement of the manipulator arm on the air cushion platform during a moving operation, it is particularly advantageous if the controller of the air cushion platform is connected to a robot controller in order to actuate the robot only when the air cushion platform is situated in the standing position.

Figure 1B:
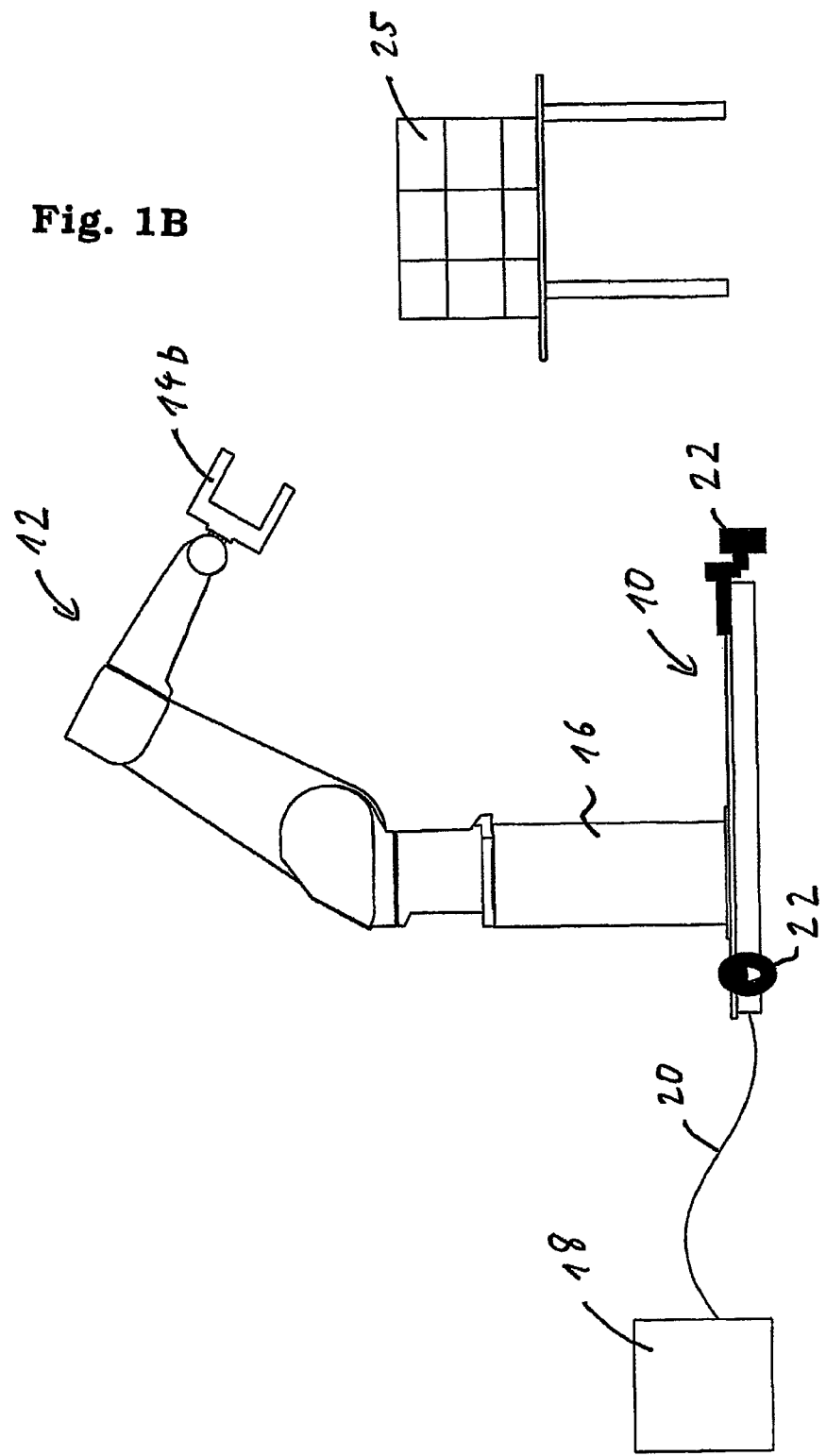
Figure 2A:
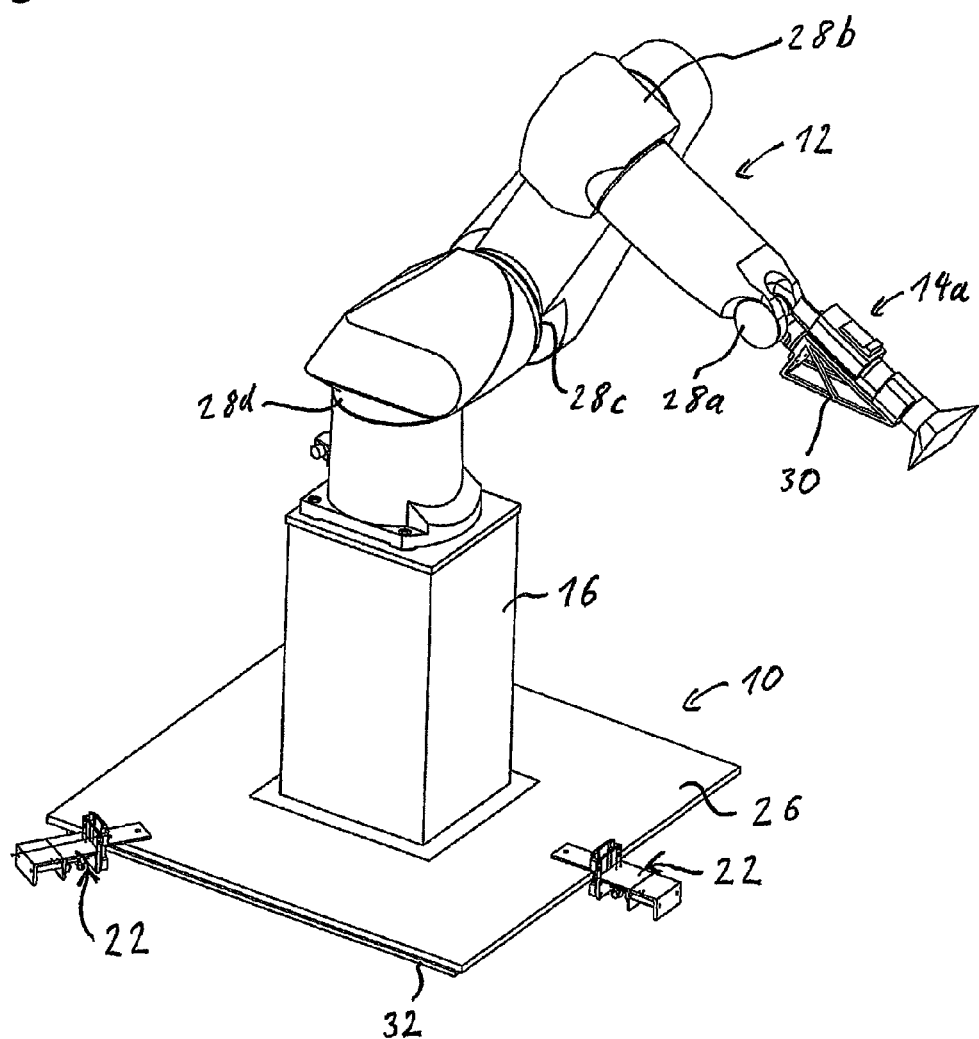
Figure 2C:
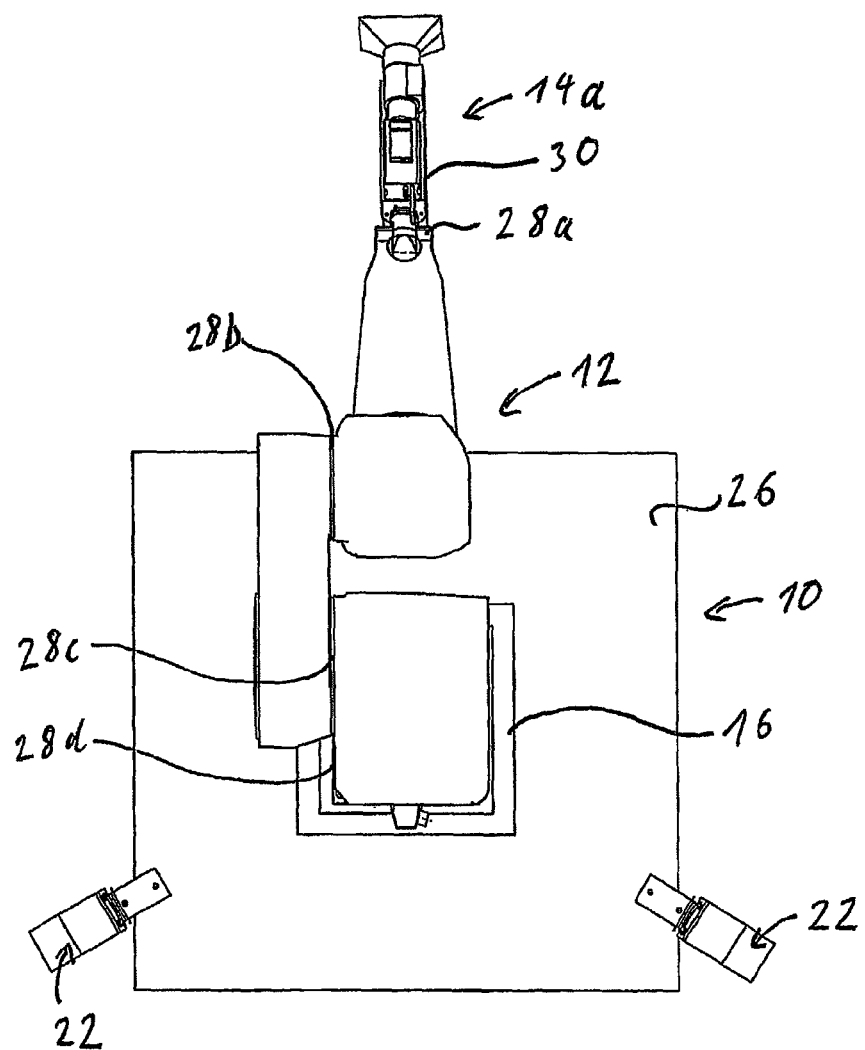
Figure 3A:
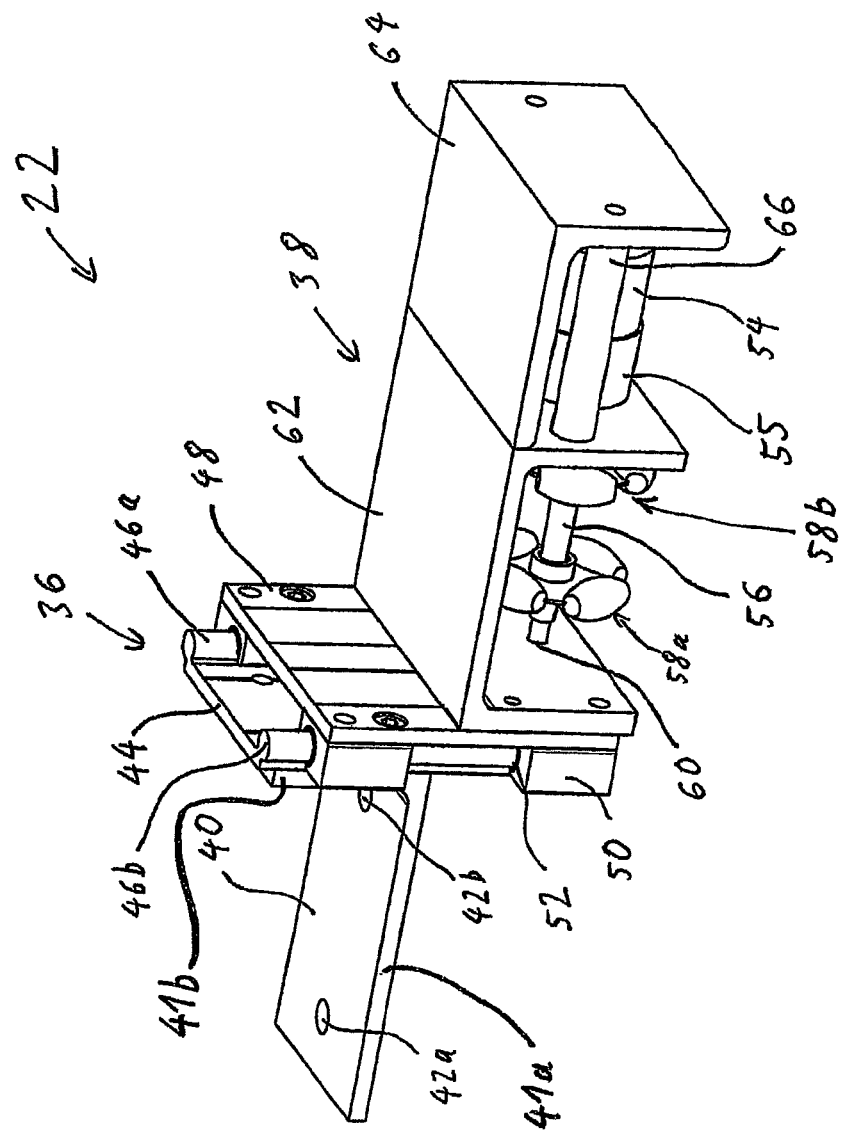
Figure 3B:
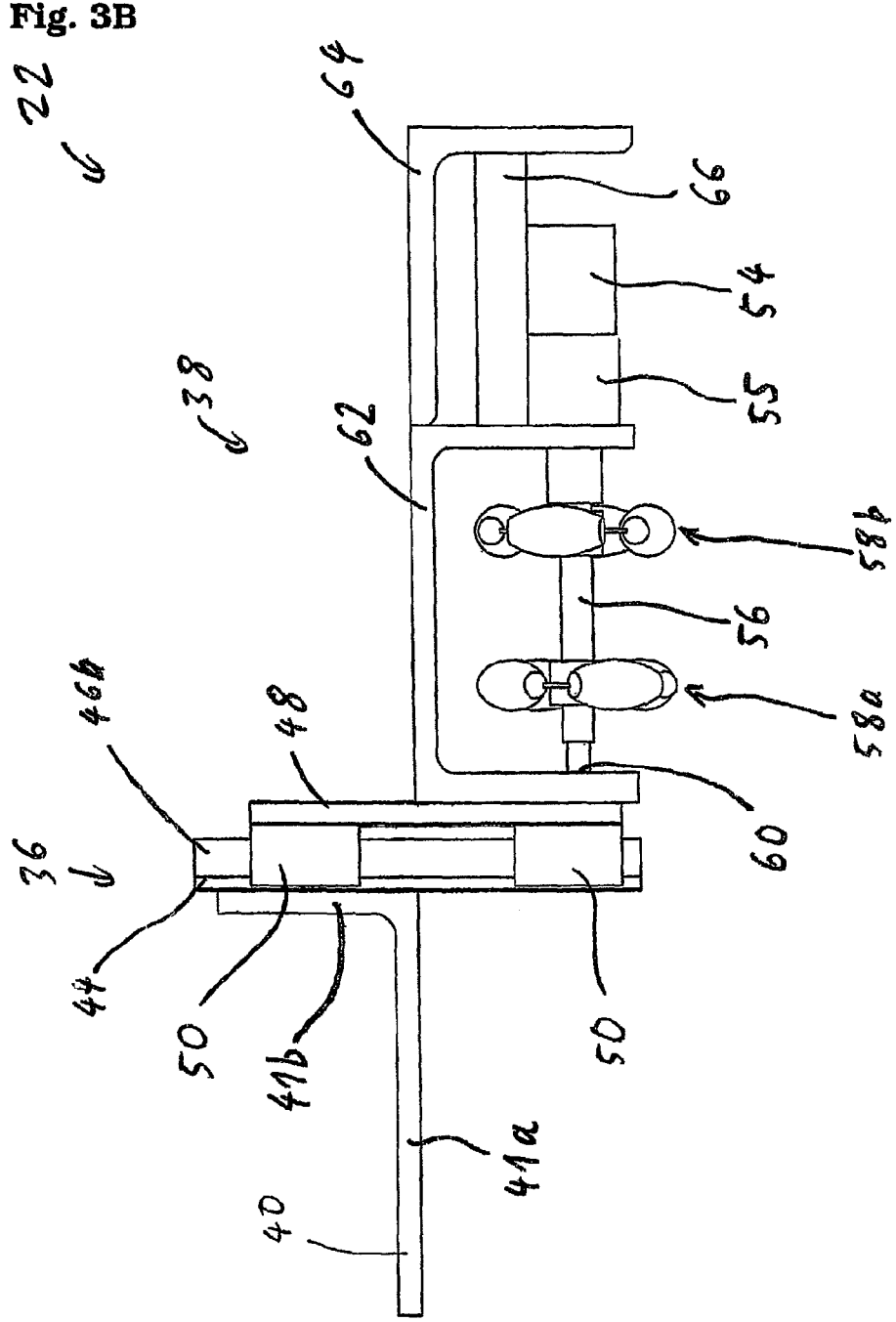
Figure 3C:
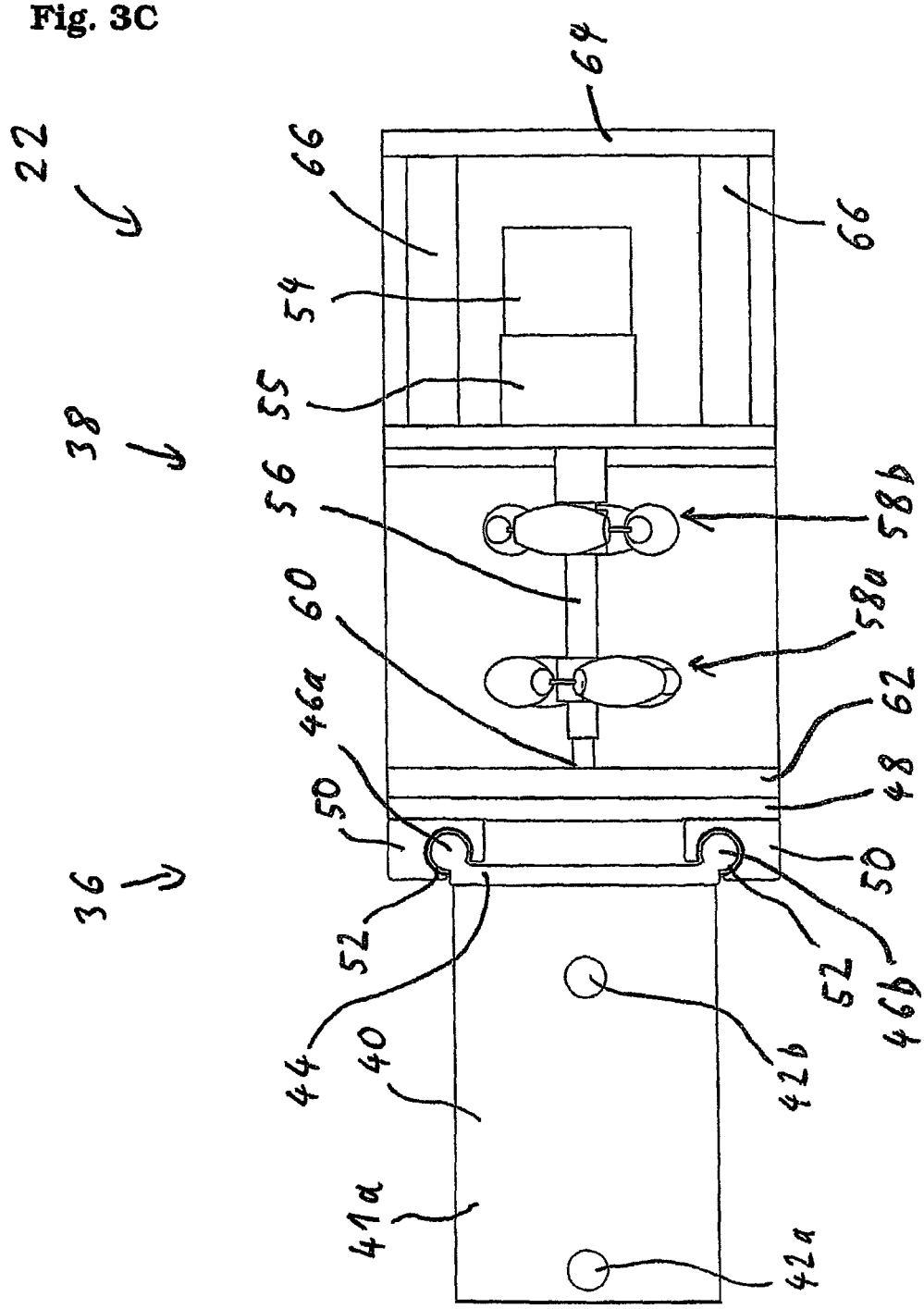
Figure 4:
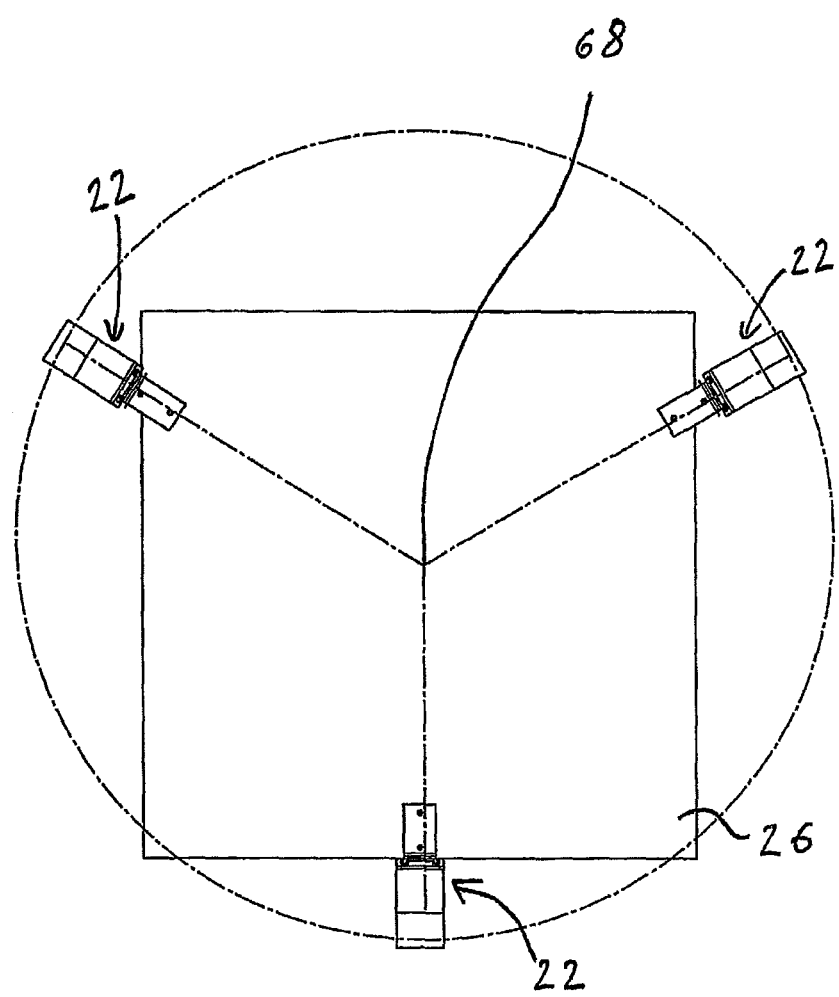

The invention is explained in more detail below by way of example with reference to the drawings, in which:

FIG. 1A shows a highly simplified diagrammatic side view of a robot with a manipulator arm which carries a film camera, in a television studio with an air cushion platform according to the invention, FIG. 1B shows a highly simplified diagrammatic side view of a robot with a manipulator arm with a gripping hand with the air cushion platform according to the invention, FIG. 2A shows a perspective view of the air cushion platform according to the invention with a manipulator arm mounted on it, FIG. 2B shows a side view of the structure shown in FIG. 2A, FIG. 2C shows a top view of the structure shown in FIG. 2A, FIG. 3A shows a detailed perspective view of an actuator device according to the present invention, FIG. 3B shows a side view of the actuator device according to the present invention from FIG. 3A, FIG. 3C shows a view from below of the actuator device according to the present invention from FIG. 3A, and FIG. 4 shows an exemplary embodiment of an arrangement of actuator devices on a base of the air cushion platform according to the present invention.

In the different Figures of the drawings, corresponding structural elements are provided with the same reference numerals.

An embodiment of an air cushion platform 10 is shown in FIG. 1A in a highly simplified diagrammatic form, on which air cushion platform 10 is mounted a manipulator arm 12 with a camera 14a on a pedestal 16 and which is set up in a television studio. A supply/control unit 18, which supplies air to the air cushion platform 10 via a supply line 20, is also joined to the air cushion platform 10. Moreover, a control line can also be integrated in the supply line 20 in order to supply current to, and control, the air cushion platform 10, the manipulator arm 12, the camera 14a and actuator devices 22.

In the scenario depicted in FIG. 1A, the camera 14a is pointed at a newscaster's desk 24 in order to film the newscaster in front of a virtual world. According to the design according to the invention, it is possible here to move the camera 14a in a controlled fashion both using the manipulator arm 12 and via the actuator devices 22 in order to detect the position and orientation of the camera at any time. It is also possible with this design to move the air cushion platform 10 to predetermined locations in order to obtain defined perspective shots with respect to a virtual world.

It is, however, also conceivable that, as shown in FIG. 1B, that instead of the film camera 14a a gripping hand 14b is mounted on the manipulator arm 12 in order to carry goods 25 from one location to another in a defined manner. The design of the air cushion platform 10 with the manipulator arm 12 with the camera 14a is further explained below, the following embodiments also applying, however, for an air cushion platform 10 in which the manipulator arm carries a, for example, pneumatic gripping hand 14b or a tool such as a measuring instrument (a laser scanner for scanning contours), a special gripper for carrying fragile vessels such as test tubes in a laboratory setting, or a welding arm.

In FIGS. 2A to 2C a detailed perspective view, a side view and a top view of the air cushion platform 10 are shown with the manipulator arm 12 and the camera 14a mounted on it.

The air cushion platform 10 has a base 26 which in the present exemplary embodiment is designed as a pedestal plate which is preferably made from steel. The steel pedestal 16, which is parallelepipedal in the exemplary embodiment shown but can also be designed as a vertical tubular pedestal, is mounted at the center of the base 26. The manipulator arm 12 is in turn mounted or bolted onto the pedestal 16 and has four joints 28a to 28d and two further joints (not shown) in the region of the hand, as a result of which the camera 14a coupled to a hand or mount 30 is enabled to move in six spatial degrees of freedom. It is, furthermore, conceivable that the camera 14a is mounted on a pan/tilt unit (not shown) which provides additional degrees of freedom in the movement of the camera 14a. The camera 14a is here a standard film camera weighing between 2 and 5 kg. The camera 14a can be controlled either via control lines in the supply line 20 (FIG. 1) or wirelessly. The mass of the manipulator arm is approximately 250 kg but can be 750 kg for a manipulator arm with a higher load-bearing capacity. The mass of the steel pedestal including the steel pedestal plate designed as a base 26 is approximately 360 kg. The surface area of the base 26 is $1.5 \times 1.5 \, m^2$.

An air cushion system 32 (FIG. 2B) which moves the air cushion platform 10 from a standing position into a moving position by means of an air cushion created below the base 26 is attached to the underside of the base 26, as a result of which the air cushion platform 10 can be moved smoothly over a floor 34. The floor 34, which in this case is the floor of a television studio, is preferably a smooth and even floor, the upper surface of which is made from metal or a plastic or is coated with a varnish.

In the exemplary embodiment shown in FIG. 2B, the air cushion system 32 is designed as a single pallet to which a plurality of small air cushions are attached which are connected by tubing and are each provided with a throughflow valve. In the event of an uneven distribution of weight, an appropriate pressure adjustment is thus automatically effected at the different points of the base 26, as a result of which the movable robot consisting of the air cushion platform 10 and the structure of the manipulator arm 12 and the pedestal 16 handles in a stable fashion. It is, however, also conceivable to mount an air cushion system on the underside of the base 26 which consists of four individual small air lifting cushions which are mounted at the corners of the base 26, as a result of which the costs of the structure are reduced. In the event of an uneven distribution of weight, however, overloading of an air lifting cushion or lifting-off of an underloaded air lifting cushion with accompanying vibration can occur, which is why an air cushion pallet is preferred.

As shown in FIGS. 2A to 2C, actuator devices 22 which are in constant contact with the floor 34 (FIG. 2B) in both a standing position and in a moving position of the air cushion platform 10 are mounted on an edge region of the base 26. It is, however, also conceivable to mount the actuator devices 22 in such a way that they are only selectively in constant contact with the floor 34, in other words can, for example, be folded upwards.

A detailed representation of an actuator device 22 is shown in FIGS. 3A to 3C in a perspective view, a side view and a view from below.

The actuator device 22 has a sliding guide 36 and a motor device 38. The sliding guide 36 here comprises a fastening bracket 40 with a first arm 41a and a second arm 41b that is perpendicular to the first arm, the first arm 41a being provided with boreholes 42a, 42b by means of which the fastening bracket 40 can be bolted to an edge region of the base 26, preferably on its upper side. The fastening bracket 40 is here designed as an angle, the second arm 41b being connected to a rail element 44 which has two cylindrical rails 46a and 46b which, when the sliding guide 36 is mounted on the base 26, run in a vertical direction. A carriage 48 is mounted on the rail element 44 so that it can slide and has carriage elements 50 which surround the cylindrically designed rails 46a and 46b and slide thereon. Plastic elements 52 can be provided as sliding elements between the carriage elements 50 and the rails 46a, 46b, which additionally reduce the frictional resistance. Thus, with the sliding guide 36, the carriage 48 can, in the mounted state, move freely in a vertical direction on the base 26 and is anchored fixedly to the base 26 in a horizontal direction owing to the positive connection between the carriage elements 50 and the rails 46a, 46b.

In terms of materials for the sliding guide, which is a "dry" sliding guide, hard anodized aluminum is, for example, suitable as the material for the rails and provides the best friction and wear properties. Because any lubrication of the system has been dispensed with, it has an extremely low sensitivity to dirt and thus does not require maintenance. The material Iglidur J/J200, which permits a maximum sliding speed of 15 m/s and an application temperature between −40° C. and 90° C., is for example suited as the sliding plastic element 52. Although in the present exemplary embodiment the sliding rails 46a and 46b are cylindrical in design, they are not restricted to this shape but can have any type of cross sectional shape which is surrounded correspondingly by the carriage elements 50.

The motor device 38 is fastened on the carriage 48. The motor device 38 has a motor 54 which has a gear 55 and is designed as a direct-current geared motor. The motor 54 here works as a servo motor in order to be able to approach a predetermined position via a predetermined number of revolutions. The motor 54 is connected via the gear 55 to a motor shaft 56 on which a pair of driving wheels 58a and 58b is mounted non-rotatably. The motor shaft 56 is hereby accommodated, on its side facing the sliding guide 36, in an accommodating hole 60 in a wheel housing 62 with a U-shaped cross section, the motor 54 being mounted at a side of the wheel housing 62 that faces away from the sliding guide 36. The motor 54 is hereby protected, from the effect of an impact from above or from the side during displacement of the air cushion platform 10, by an angled motor protecting bracket 64 which is fastened to the wheel housing 62 by pin-shaped fastening elements 66. The arrangement of the motor 54 on an outer side and the arrangement of the driving wheels 58a and 58b connected thereto in the vicinity of the sliding guide 36 has the advantage that the forces exerted on the sliding guide 36 when the base 26 is displaced are kept small owing to the small lever between the driving wheels and the sliding bearing.

The motor 54 used preferably has a gear reduction of the gear 55 of 1/100, wherein it has a drive speed of approximately 60 revolutions per minute, a power consumption of 1 to 100 W, preferably 1 to 10 W, and a maximum torque of 150 to 500 Ncm. The driving wheels 58a and 58b are designed as omni wheels which are also known in the prior art as Swedish wheels or Mecanum wheels. These omni wheels are specially designed wheels which, on the circumferential surface of a main wheel, have further usually barrel-shaped auxiliary wheels, the axes of rotation of which lie, for example, at right angles to the axis of rotation of the main wheel. In use, this allows these wheels also to be used in non-parallel fashion, without impeding each other, as a result of which a differential is not required. In the case of the omni wheels 58a and 58b shown here arranged in pairs, the latter are arranged on the motor shaft 56 relative to each other in such a way that the wheels 58a, 58b are offset relative to each other by an angle of 45° in order to ensure a smooth and even motion. The diameter of the wheels 58a and 58b is hereby approximately 60 mm and the shaft diameter approximately 8 mm, wherein the latter has a maximum load-bearing capacity of 20 kg. Although the paired arrangement of the wheels 58a, 58b is preferred owing to the smooth motion, it is, however, also conceivable to provide in each case only one omni wheel of the Mecanum type on a motor shaft 56.

When omni wheels are used as the driving wheels 58a, 58b, the actuator devices 22 are, as shown in FIG. 4, preferably arranged on three sides of the base 26 in a circle and at an angle of 120° to one another, a common point of intersection 68 of an imaginary extension of the three motor shafts 56 simultaneously being the approximate center of gravity of the entire system. The base 26 can thus at any time move in any direction and, moreover, be rotated about the common point of intersection 68.

Although the exemplary embodiment shown in the Figures, with actuator devices which are rigidly connected to the base 26 and which use omni wheels 58a and 58b, is particularly advantageous, it is, however, also conceivable to use normal driving wheels, wherein either the driving wheels are connected to the motor 54 via a swiveling cardan shaft, or the entire actuator device 22 or the motor device 38 is mounted so that it can rotate or swivel in a horizontal direction with respect to the base 26. In both cases, a further actuator then needs to be provided which adjusts the deflection of the cardan shaft or the motor device.

As the motors 54 used are small and correspondingly light, and the motor device 38 likewise not very heavy, a further weight (not shown) must additionally be attached in order to press the motor device 38 appropriately strongly against the floor. It is hereby advantageous to attach this weight as closely as possible to the sliding guide 38 on the motor device 36, in other words above the driving wheels 58a, 58b, so that no jamming of the sliding guide 36 can occur when the motor device 38 is lowered or raised. It is also possible, instead of attaching a simple solid weight, to use weights which can perform a function, ie are intelligent. A laser scanner or an industrial security system or monitoring system are, for example, suitable for this purpose. This system could detect as soon as people approach the air cushion platform 10 and switch off the drive, in order to prevent a collision. On the other hand, further sensors could be used which enable position detection in order to determine the position and orientation of the air cushion platform 10 with respect to a predetermined reference system on the floor 34. It is, however, also conceivable to press the motor device 38 against the floor by means of a spring which is arranged operatively between the base 26 and the motor device 38.

The air cushion platform 10 according to the present invention also has a control device (not shown) which controls the interaction of the three actuator devices 22, as shown in FIG. 4, and which furthermore ensures that the actuator devices 22 do not operate when the air cushion platform 10 is not situated in a driving position (when the air cushion system is non operational). In the present exemplary embodiment, three actuator devices 22 are used but it is also possible to use more than three actuator devices 22, wherein, for example in the case of four actuator devices 22, these can each be arranged in pairs on opposite sides of the base 26. It is, however, also conceivable to provide only two actuator devices 22, the connecting line of which runs through the approximate center of gravity of the entire system.

Moreover, the invention is not limited to the use of a vertically displaceable sliding guide, which is particularly advantageous. Thus, for example, the motor device 38 can also be fastened to the base 26 via a double joint in the case of a pair of omni wheels or via a single joint in the case of a single omni wheel.

In the exemplary embodiment described, the motor 54 serves only for the acceleration of the air cushion platform 10 as, by virtue of the air cushion, there is essentially no more friction between the floor 34 and the base 26, which would need to be overcome by motor power 54. It is thus possible, through the use of an air cushion platform, to use actuator devices which are generally filigree in their manner of construction in order thus to move a camera platform which weighs over 500 kg to a precise position. It is, however, hereby necessary that the abovementioned controller also ensures that the manipulator arm does not move during the travel as, owing to the high load-bearing forces, a movement of the manipulator arm would exert excessively high forces on the driving wheels 58a, 58b, as a result of which the wheels 58a, 58b could either slip or become damaged. This control is, however, not necessary if robust actuator devices are provided.

The invention claimed is:

1. An air cushion platform for carrying a manipulator arm having:
   a base;
   an air cushion system attached on a bottom side of the base for lifting the base above a floor,
   at least one actuator device fastened on the base, the at least one actuator device being selectively in constant contact with the floor in order to move the base on the floor, and
   a controller which is connected to the air cushion system and the at least one actuator device, in order to actuate the at least one actuator device only when the air cushion platform is located in a moving position,
   wherein the at least one actuator device comprises a motor device which is mounted on the base so that the motor device can be displaced vertically by means of a sliding guide.

2. The air cushion platform as claimed in claim 1, wherein the air cushion system comprises a pallet with a single air cushion or an air cushion system with a plurality of air cushions connected to one another.

3. The air cushion platform as claimed in claim 1, wherein the sliding guide comprises:
   a fastening bracket with a first arm and a second arm which is being perpendicular to the first arm and the first arm being suited for fastening the sliding guide to the base,
   a rail element which is connected to the second arm of the fastening bracket, and
   a carriage which is mounted in sliding fashion on the rail element and which is connected to the motor device.

4. The air cushion platform as claimed in claim 1, wherein the motor device comprises:
   a direct-current geared motor which is designed as a servo motor and has an encoder, and
   at least one driving wheel which is connected to a motor shaft of the direct-current geared motor and is in constant contact with the floor via an actuator device fastened to the base.

5. The air cushion platform as claimed in claim 4, wherein the motor device has a wheel housing and a motor protecting bracket to protect the at least one driving wheel and the motor.

6. The air cushion platform as claimed in claim 4, wherein the at least one driving wheel corresponds to a pair of omni wheels.

7. The air cushion platform as claimed claim 6, wherein the at least one actuator device includes three actuator devices arranged on the base in a circle and being provided at an angle of 120° to one another, a common point of intersection of the three motor shafts of the motor devices being an approximate center of gravity of the entire system.

8. The air cushion platform as claimed in claim 1, further comprising sensors for position detection.

9. The air cushion platform as claimed in claim 1, wherein the motor device is mounted rotatbly or pivotably on the sliding guide.

* * * * *